Aug. 22, 1939.   M. J.-B. BARBAROU   2,170,444
TWO-SPEED STEP-UP GEAR WITH HYDRAULIC CONTROL
Filed July 8, 1937
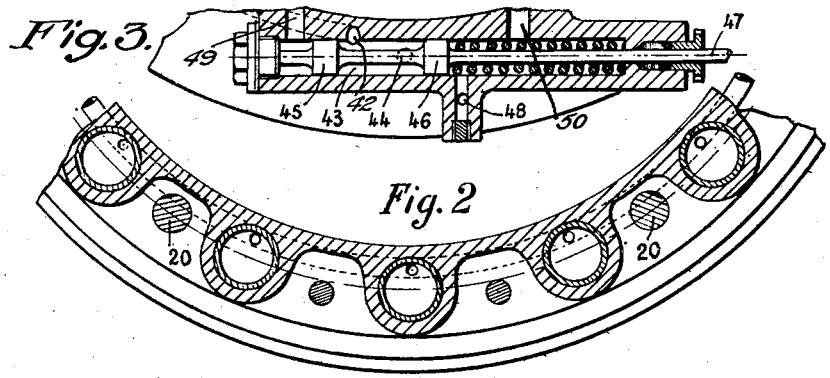
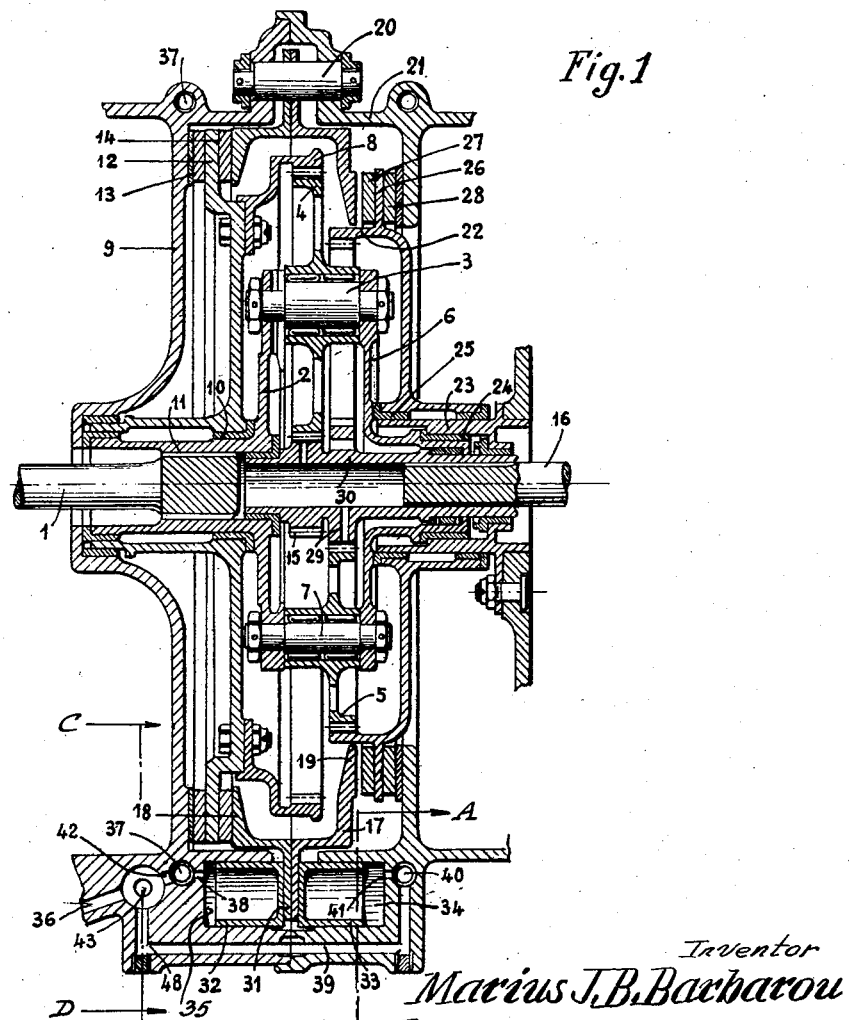
Inventor
Marius J.B. Barbarou
By Raymond A. ......
Attorney Patented Aug. 22, 1939

2,170,444

UNITED STATES PATENT OFFICE 2,170,444

TWO-SPEED STEP-UP GEAR WITH HYDRAULIC CONTROL

Marius Jean-Baptiste Barbarou, Neuilly-sur-Seine, France

Application July 8, 1937, Serial No. 152,590
In France July 10, 1936

2 Claims. (Cl. 74—277)

The present invention relates to a step-up gear with hydraulic control and it has for its object to provide a step-up gear which is adapted to provide for two gear ratios, such gear being particularly intended for use with internal combustion motors provided with supercharging compressor.

According to a feature of the invention, the step-up gear is constituted by a double series of trains of straight pinion gearings, each series comprising an outer rim adapted to be fixed, on which roll the satellite pinions mounted on a movable plate and a pinion integral with the driven shaft. According to whether the one or other outer rim is fixed by any suitable means, there is obtained on the driven shaft the speed desired.

Another object of the invention is to provide each toothed rim comprising a plate or clutch disc provided with friction lining; a movable clamping ring being adapted to fix, by displacement, progressively against a fixed casing, one of the rims or, by the opposite displacement, the other rim thus also liberating the first one which at this moment having become idle, no longer intervenes in the step-up process.

The movable ring, the surfaces of which serves alternately for fixing the rims is preferably provided with a circular shoulder engaged between two series of pistons moving in cavities or cylinders of the fixed casing and distributed over the whole periphery; the displacement of the pistons of each series is reversed. Under the action of the pressure of a fluid such as oil the pistons of one series, in the same plane perpendicular to the axes of the driving and driven shafts, move in one direction and at the same instant the pistons of the second series move in the opposite direction; the placing of one series under pressure causing the fall of pressure on the other series.

The control can naturally take place by hand but it can also be made automatic on an aeroplane by means of a manometric box and any mechanical relay causing one of the speeds to come into operation according to the altitude of flight at any instant.

A preferred embodiment of the invention is shown in the accompanying drawing wherein:

Fig. 1 is a longitudinal section of the step-up gear through the driving and driven shafts.

Fig. 2 is a partial cross-section through the line AB of Fig. 1.

Fig. 3 is a section on the line CD of Fig. 1 showing diagrammatically the control device.

Suppose 1 to be the motor shaft on which is mounted the plate 2 supporting pivots 3 and 7 of the satellite pinions 4 and 5 determined in number and dimensions by the speeds desired.

A first toothed rim 8 centered on the one hand in a casing 9 and by a bearing 10 on the hub 11 of the plate 2, comprises a circular disc 12 provided on its two faces with friction linings 13 and 14. The first step-up speed therefore comprises the outer rim 8, the plate 2, the satellite 4 and a toothed pinion 15 splined on the driven shaft 16.

A ring 17 movable parallel to the axes of the shafts 1 and 16 comprises two shoulder surfaces 18 and 19. The surface 18 is shown in the position of the locking of the rim 8 against the casing 9. Rollers 20 supported by the casing 9 and a cover 21, distributed over the whole circumference as shown by Fig. 2 permit the displacement of the ring.

The second speed comprises a toothed rim 22, a plate 6 supporting with the plate 2 the satellite pinions 5 mounted on the trunnions 7. The plate 6 is centred in the fixed casing 23 by a bearing 24 and the outer toothed rim is centred by the bearings 25. It comprises a circular disc 26 and two friction linings 27 and 28.

A pinion 29 on the trunnion 30 drives the shaft 16.

The movable ring 17 is provided externally with a ring 31 located between pistons 32, 33 distributed over the whole circumference of the ring. The pistons can move in cylinders 34 and 35 of the casing 9 and the cover 21.

The delivery of the fluid under pressure takes place by the piping 36. In the case of engagement in first speed, the fluid under pressure passes in the pipe 36 to the pipe 37, arranged circularly in a plane perpendicular to the axis of the shaft. Small ports 38 place the piping 37 in communication with the cylinders 35. At this moment the pistons press the rim 22 on the casing 21 by the surface 19 of the movable ring 17 against the lining 27 of the said rim.

In the case of engagement in second speed the fluid passing through the pipe 36 runs through the conduit 39, enters the circular conduit 40 and through the openings 41 penetrates into the cylinders 34. The bearing of the movable ring 17 then takes place by the surface 18 to press the toothed rim 8 against the casing 9.

Fig. 3 shows diagrammatically the device controlling the change speed. The fluid under pressure comes through the hole 44 and enters a chamber 43 limited by a cylindrical bore in the casing and the two movable shoulders 45 and 46 are displaced by a rod 47. The first position of the rod and of the shoulders limits a second communication chamber with the hole 48 to supply the pipe 39. The fluid from the chamber 43 flows into the casing through the hole 49. Conversely in returning to the position of Fig. 3 the fluid can flow to the casing through the hole 50, causing the pressure to fall in the cylinders 34 and discharging the toothed rim 22.

The device forming the object of the invention permits of effecting the progressive working of the compressor from one speed to a higher speed or vice versa, thus preventing by a distribution of the forces properly counterbalanced an excessive rate of working or a too sudden variation of the rate of working of the members in operation.

I claim:

1. In a step-up speed gear having driving and driven shafts, planetary gear pinions to which said shafts are in engagement, and two outer gears meshing with the pinions and adapted to be selectively locked, an axially movable ring adapted to lock one and release the other outer gear, said ring co-operating with friction material on the outer gears for braking purposes, and opposed sets of pistons circumferentially distributed around the ring for laterally moving the same against one or the other outer gear.

2. In a step-up gear as claimed in claim 1, means for supplying oil pressure to one set of the pistons while releasing pressure on the opposed corresponding pistons set.

MARIUS JEAN-BAPTISTE BARBAROU.